United States Patent
Mendelson et al.

[15] 3,637,405

[45] Jan. 25, 1972

[54] PROCESS FOR PACKAGING AND PRESERVING MEATS

[72] Inventors: William J. Mendelson, c/o Hillcrest Poultry Industries, P.O. Box 1707 48 Commercial St., Lewiston, Maine 04240; William F. Morris, Jr., Morris & Associates, Inc. P.O. Box 1406, Raleigh, N.C. 27602

[22] Filed: May 16, 1969

[21] Appl. No.: 825,430

[52] U.S. Cl. .................................................99/194, 99/174
[51] Int. Cl. ...........................................................A23b 1/00
[58] Field of Search ........................99/157, 174, 194, 171 R

[56] References Cited

UNITED STATES PATENTS 3,359,122   12/1967   Zebarth et al. ..........................99/194

OTHER PUBLICATIONS

Beatty, " The Method of Enzyme Action" 1917, published by J. & A. Churchill, London, page 45.

*Primary Examiner*—Hyman Lord
*Attorney*—Mason, Fenwick & Lawrence

[57] ABSTRACT

A process for packaging and preserving meats to give long shelf life and greater tenderness comprising: slaughtering the animal to produce a carcass, dressing, eviscerating and cleaning the carcass to form meat units, packaging at least one of the meat units prior to attaining a temperature of 40° F. and generally above 70° F. in a vaporproof package within approximately 2 hours after slaughter to prevent shrinkage of the meat due to dehydration, exposing the packaged meat unit to a chilling medium such as an airblast at below −20° F. for sufficient time to establish a negative heat content reservoir within a surface zone of a meat unit generally comprising about one-third or less of the mass of the meat unit, the negative heat content reservoir being formed by reducing the temperature of the mass of the meat unit within the surface zone to below 27° F. and generally between 0° to 27° F. and preferably 20°–27° F., to create an increased sensible heat capacity and extracting the heat of fusion of said mass within the meat unit to freeze the mass and provide a latent heat capacity, withdrawing the packaged unit from contact with cold gaseous medium upon attaining an internal zone meat unit temperature of approximately 30° to 44° F. and a sufficient negative heat content reservoir to absorb all of the heat to be lost from the internal zone, and maintaining the packaged meat at a temperature above 28° F. for a sufficient time to absorb the sensible heat and latent heats from said internal zone into said negative zone capacity reservoir and equilibrate the temperature throughout the meat unit whereby to avoid natural meat juice weeping during storage, and activating the natural enzymes in the surface zone to effect improved tenderization.

9 Claims, No Drawings

PROCESS FOR PACKAGING AND PRESERVING MEATS

PRIOR ART

Providing cut-up meats, both poultry and red meats, has presented problems for the meat retail merchant for a number of years. Primarily, the retailer's problem is one of assuring an attractive and acceptable fresh meat product packaged in sanitary condition while maintaining an overall economical and sanitary atmosphere. Nowhere are the problems more acute than with poultry handling in which the industry has artificially created difficulties and simply has not to date been able to solve them.

For an understanding of the present difficulties, a knowledge of the past practices is necessary. In the poultry industry, the competition has forced the poultry processors to depend upon tremendous volume for successful operation, and even then profits are measured in fractions of a cent per pound for a 3- to 5-pound dressed bird. In approaching the limits of volume in numbers of birds, it was sometime ago discovered that the necessary chilling of the bird can be readily achieved by immersing the bird after it has been dressed in a cold liquid bath, generally an ice water bath. The use of such a bath was found to provide two important functions. The first, obviously, to cool the bird as rapidly as possible down below 40° F. to prevent the buildup of bacteria and to meet USDA regulations; and, second, to add moisture to the bird. Unfortunately, the water bath also was a haven for bacteria which required carefully controlled low temperature for the final product to stem the growth of these micro-organisms, and even then would substantially shorten shelf life of the product in normal distribution and marketing channels.

The addition of moisture to the bird was hailed as a great benefit to the poultry processor since the dressed bird may add as much as 12 percent of its weight in moisture picked up in the water chill. In the processing of many thousands of pounds of poultry in an hour, it can be readily seen that the added moisture simply and easily increased the volume of the poultry processor without additional overhead. While the moisture pickup is controlled by the USDA, the present operations of most processors are to provide at least 8–12 percent additional moisture during the water chill and has been, in many operations, the margin of remaining in business. Zebarth, U.S. Pat. No. 3,359,122, is typical of the present water-chill methods.

The retail merchant has accepted this added moisture in the poultry, but apparently did not quickly recognize that the moisture addition posed greater burdens and that the bacteria picked up in the bath shortened the shelf life of the product. Perhaps due to long experience of the retailer with the wet, dripping and leaking poultry, the higher moisture of the water-chilled product was not much more objectionable than past practices. This water-chilled poultry was first received without real objection since no better solution could be found.

Continued experience and new problems facing the retailer, however, gradually brought about a negative view toward added water in the poultry. The retailer found, for instance, that unless immediately frozen and maintained in frozen or crusted condition, the high moisture content would leak from the poultry in what is aptly referred to as "bloody water weepage." This weepage is a continuing source of trouble for the retailer since it creates substantial sales resistance from the consumer, and adds to the water originating from the ice in which the poultry is usually packed. This flow of the weepage also makes it quite difficult for the retailer to maintain the required sanitary conditions.

The poultry is not normally received from the processor in a frozen condition since hard-frozen birds cannot be readily cut up, and the retailer has up to the present time included butchers on his staff who would cut up the poultry into appropriate parts and package it at store level. While there have been attempts in the past to have the poultry precut by the poultry processor, the retailer generally balked because of the loss of work for the butchers.

At the present time, expansion of many of the chain store outlets has required a greater number of butchers which simply have not been available. This has forced the retailer to have the poultry precut up by the poultry processor. However, the problems of the bloody water weepage are present to a greater extent with precut-up poultry whether it was packaged or not due to the greater number of cut surfaces. Naturally, the consumer finds the bloody water weepage particularly distasteful, and it is felt that poultry sales have been held back in spite of relatively lower prices compared to other meats.

Water-chilled precut-up parts also posed the problem that the final weight of the product received by the consumer was difficult if not impossible to determine due to the weepage. Frequent inspection by the Federal or local authorities checking the weights of the product in accordance with the label on the package would reveal that the product did not weigh out as indicated on the label due to the weepage loss of the fluids. To offset this loss in weight, it would be necessary for the retailer to "give away" added ounces at the time of weighing presuming that such an amount might be lost during storage. Clearly, due to the lack of uniformity and predictability of this loss, this often necessary approach was quite uneconomical.

Present experience by the art required under the water-chill process following the previously mentioned Zebarth patent has also raised the problem of storage life due to the high bacteria pickup in the bath. Unless frozen, the shelf life of such poultry products is normally limited to 10 to 14 days. This is not quite long enough in many instances where delays in shipping have occurred. The shelf life of an unfrozen product depended upon the holding temperature and usually required 28° to 30° F. (near tissue freezing temperature) with minimum fluctuations for acceptable shelf life, and control of visible bloody water weepage. When these temperature controls were not available or broke down, undesirable bacterial growth and bloody water weepage began drastically reducing the shelf life of the product.

The art recognized that weepage could be solved by simply freezing and maintaining the cut-up poultry frozen since then there would be no flow of fluids. This also would hold back any growth of bacteria for an enhanced shelf life. Freezing, however, brought additional problems. The majority of consumers do not find frozen cut-up poultry appealing and insist upon unfrozen poultry. More importantly, freezing without adequate aging will arrest or at least slow down the natural enzymatic processes which bring about tenderization. The result of rapid freezing to a solid condition soon after slaughter is usually to produce a tougher meat. This loss of tenderness occurs in many of the presently available meats because of improper aging and freezing.

Faced with driving the poultry customer to other foods, no matter which presently available practice is followed as well as imposing a greater burden upon the retailer, the poultry processor has long sought a solution. The solution must not bring about loss of tenderness, must not be marketed in a frozen or crusted state, nor may there be either dehydration or "bloody water weepage."

The source of the weepage and sanitation problems may have been readily recognizable, but no one of the chicken processors would even consider the possibility of avoiding the more common water chill since in so doing there would be an immediate and decisive cut in the profits commensurate with the loss in weight of the poultry from the loss of moisture pickup. The water chill simply "had to stay" since experience showed that the alternative hard freezing clearly was not acceptable to the public.

To underscore the determination of the art to retain the water chill in spite of all these disadvantages and drawbacks, the predominate method of retailing chicken parts today is still the water chill with its attendant bloody water weepage and built-in unsanitary uneconomical practices.

OBJECTS

It is a principal object of the present invention to eliminate the bloody water weepage in poultry products with minimum loss in packaged weight compared to present methods.

Another object of the present invention is the provision of a method for effecting a natural tenderizing of the meat and a tastier product.

Another object of the present invention is to assure proper natural enzymatic action to permit tenderization by holding the meat at a temperature conductive to aging.

A further object of the present invention is to minimize shrinkage of the product and to retain the maximum weight of the product in the packaged condition.

Another object of this invention is to eliminate the water-chill bath and the associated bacteria so as to permit a longer shelf life and a more sanitary product.

A further object of the present invention is to significantly reduce handling of meats prior to packaging and thereby bring about less contamination of the product.

Yet another object of the present invention is to reduce the toughening of poultry meat at the skin surface due to the action of mechanical picking fingers.

The process of this invention also has as an object the production of a packaged meat product having a more pleasing appearance and bloom including a more natural color and a better flavor through the retention of the natural juices in the product.

The process of this invention is applicable to any and all animal meats including the red meats such as beef, lamb, pork, etc., but is primarily applicable to poultry products. Within the term "poultry," such as chicken, turkeys, ducks, geese, guineas, and the like, are to be included.

DETAILED DESCRIPTION OF THE INVENTION

In accordance with the present invention, it is intended to transform a freshly dressed poultry carcass either whole or in cut-up parts forming meat units within 2 hours after slaughter into a package whereby the packaged meat unit will undergo a unique dual-condition cooling, a surface freezing, and an equilibration to achieve the benefits of the present invention. In order to meet the standards of the USDA, it is necessary to have the meat unit in whatever form in the process of being chilled below 40° F. within a 2-hour period after slaughter. In accordance with the present invention, it is simple practice to lower the temperature of the meat unit to below 40° F. in 1½ hours or less, thereby remaining well within the limit set by the USDA.

Throughout the process of the present invention, all important safeguards are taken against the infusion of bacterial growth from micro-organisms in the products produced. Primarily, speed, cleanliness and the absence of a liquid chill in contact with the meat will avoid any undesirable micro-organism buildup. To this end, the present process is designed to be carried out as a continuous process and as rapidly as present modern-day equipment can effect the lowering of the temperature.

The beginnings of the method of this invention involve the usual scalding and defeathering, and then evisceration and cleaning. The total time to complete these operations may involve about 30 minutes although it is a simple matter to reduce this time to about 20 minutes. The poultry then optionally proceeds through a washing line wherein the poultry is washed. Another 5 or 10 minutes at most may be consumed in this operation. To this point the operation is standard and conventional.

The following steps of the present invention involve the discovery that if the meat is cut up into meat units or maintained as a whole carcass, also included within the term "meat unit" as used throughout this application, and packaged within a vaporproof environment, the loss of moisture with the resulting shrinkage and unfavorable appearance and color as well as the accompanying toughening of the skin would not occur. Moreover, it was found that it is necessary to effect the cooling of the packaged meat unit in a unique manner which not only prevents the loss of the natural body fluids but also effects a substantial tenderizing of the meat tissues.

It was discovered that the cooling of the packaged meat unit must meet two conditions, (a) a negative heat content reservoir must be formed including the outer or surface zone of the meat unit cooled to a sufficient degree to create not only an increased sensible heat content or heat-absorbing capacity therein, but also upon freezing the surface zone only, the withdrawal of heat comparable to the heats of fusion of the tissues and body fluids within the surface zone establishes a latent heat content or capacity; (b) the temperature gradient between the skin temperature and the internal zone temperature must be greater than 20° F. throughout the cooling process during which the skin temperature is lowered.

With respect to the first condition, it was discovered that if a surface zone of a meat unit were to include a cold reservoir or bank having a negative heat content alone sufficiently capable of absorbing the amount of heat remaining in an internal or inner zone containing the highest temperature of the meat product after removal from a cooling environment and was permitted to lower the temperature of the internal zone of the meat product to a desirable degree without external cooling means or media, that the subsequent slow cooling of the internal zone through the absorption of heat by the surface or outer surface zone slowly lowers the temperature of the internal zone of the meat unit. In so doing, the negative heat content of the surface zone is consumed and the surface zone is thawed. Importantly, the internal zone is not frozen, but cooled to the desired temperature by giving up heat to the surface zone.

Essentially, the negative heat content reservoir is composed of the heat content capability due to the reduction of the temperature of the mass of the tissue and fluids in the surface zone below a desired final equilibrated temperature. The mass of the surface zone is approximately one-third or less of the mass of the meat unit, usually one-third to one-sixth, which is the outermost portion of the group of superposed or overlapping parts or single part as packaged. Generally, the thickness of the internal zone is between one-sixteenth–one-half inch and includes the skin and only the portion of the meat unit most closely adjacent to the skin and the tissue exposed to the chilling medium. The sensible heat of this surface zone is computed from the mass and the specific heats of the various components of the surface zone which includes not only the tissue but each of the body fluids. The latent heat of fusion of these fluids and tissue will comprise at least 75 percent, usually about 80 to 95 percent of the negative heat content of the negative heat content reservoir which includes all the surface zone.

The second condition to be attained during the cooling of the packaged meat unit is that the temperature gradient between the skin temperature and the temperature of the internal zone which is the highest in the meat unit must be quickly reached and maintained greater than 20° F. throughout the cooling process during which the skin temperature is being lowered or in contact with the cooling medium.

This particular condition is important to attaining a desirable final product because it directly affects the bacteria count, flavor, preservation of the body juices, tenderization of the tissues of the surface, and allows more economical processing. Also, since the highest bacteria count is usually found on the skin, the more rapidly this skin surface temperature is reduced, the slower the bacteria growth rate.

A gradient of at least 20° F. between the skin temperature and the internal zone temperature achieves a very rapid reduction in the temperature of the surface zone from which it will follow that there is a correspondingly lower bacteria count of approximately 60 percent of that of other chilling methods.

The greater the gradient above 20° F., the more rapid is the lowering of the temperature within the meat, and the more rapidly the temperature range in the surface zone is taken below that which is conducive to the growth of bacteria.

The very rapid heat removal affected by the high-temperature gradient preserves the flavor of the product by preventing the deterioration of the body juices. A slower cooling rate occurring due to a temperature gradient of less than 20° F. would not protect the natural flavor.

One of the unique facets of maintaining the particular temperature gradient of greater than 20° F. and cooling the surface zone to a temperature of 27° F. or below in accordance with the present invention is that the rapid freezing of the tissues within the surface zone will produce a tenderizing effect on these surface tissues, particularly those tissues of the surface zone that have been adversely affected by the beating action of the conventional feather-picking fingers or other mechanical handling apparatus. In the latter situation, it is known that the action of these picking fingers causes localized toughness in the surface tissues, but heretofore no method was available to alleviate the problem without producing a product that was otherwise too tough for reason of lack of adequate enzymic activity or too solid and rejected by the consumer.

The freezing of these potentially tougher surface tissues at a temperature of 27° F. or below followed by thawing of such tissues during an aging and equilibration period brings about a tenderness which would not otherwise have been achieved. This process then avoids the rock-hard crusted product and permits the full enzymic action when equilibrated at 28°–40° F.

The more rapid cooling effected by the high-temperature gradient is significant since it permits freezing of only the outer or surface zone tissues while preventing the freezing of the internal zone tissues. The gradient becomes less and less after the initial contact of the meat unit with the cooling medium, but if it fell below 20° F. it would indicate that the inner zone temperature was lowered too far to the freezing point so as to approach the skin temperature. As the internal zone temperature is lowered, the temperature gradient must be carefully maintained to at least 20° or greater to prevent the undesirable freezing of the internal zone. Thermocouples properly placed in the inner zone and the outer zone will permit the exact temperature to be determined.

The more rapid cooling effected by the greater temperature gradient results in less residence time in the chilling apparatus, less floor area required for the equipment, a lower equipment cost, and less labor cost. The color and appearance of the product is also enhanced by maintaining a temperature gradient of at least 20° F. or more since particular enzymes which adversely affect color become less active at lower temperatures.

When a sufficient negative heat content reservoir is established by subjecting the packaged meat unit to a cold environment for a sufficient length of time while simultaneously maintaining the necessary temperature gradient of at least 20° F., then the packaged meat unit is removed from the environment. At this point the internal zone is at a substantially higher temperature than the surface zone, and there follows a transfer of heat from the inner zone to the surface zone until the inner zone and surface zone have equilibrated to an approximate even temperature.

One of the unique features of this invention is the fact that the enzymes inherently present in the meat are not inactivated in the internal zone since it is not frozen, nor are they inactivated during the period after the surface zone has given up the latent heat fusion and equilibration takes place usually at a temperature between 28° through 40° F. It has been found that the prior practices would freeze the meat solidly thus preventing or at least retarding the natural enzymes from acting to effect tenderizing. Since most of these enzymes are only active, at least noticeably, at temperatures above the freezing point of meat, the tenderness sought for an acceptable commercial product never occurred.

In most specific terms, the process of the present invention begins to depart from that disclosed in Zebarth, U.S. Pat. No. 3,359,122, by packaging the meat in a vaporproof environment while it is still warm. In normal operation the body temperature of the chicken, for instance, after evisceration would be approximately 90° to 105° F. and at the time the poultry is packaged would, in the case of chicken, generally yield a temperature of from 75° to 90° F. In accordance with the present invention, there is no chilling by artificial means of the poultry prior to packaging whether the poultry is packaged as a whole carcass or is cut up into various common parts. Here it might be noted that it is found to be far easier to cut up warm carcasses as compared to those that are chilled.

It is expected that the temperature of the poultry prior to packaging should not be below 60° F. However, it should be understood that the particular temperature at which packaging is accomplished is not critical and may, in fact, be any temperature above 40° F.

In accordance with the present invention, the ideal though not critical time for completion of the packaging would be about 1 hour and 30 minutes from the time of slaughter through dressing, eviscerating, cutting up, and packaging, but as short as possible in order to reduce the bacteria count on final product to a minimum. The package used in accordance with this invention is a vaporproof package which may be of the polyethylene type but could also be any of the well-known conventional vaporproof wrapping materials such as "Saran" wrap, polyvinyl chloride and copolymers thereof, and polyesters, metal foils, and the like. The only important factor in the choice of the package material is the avoidance of the loss of moisture through the package. Once the meat unit has been wrapped in the moisture or vaporproof barrier, it no longer is subject to the shrink attendant to the loss of moisture experienced in any cooling to below the freezing point of the tissue.

The poultry or other meat forming the meat unit is usually, although not necessarily, placed upon a plastic tray that may be a styrene or a urethane composition but around which is placed the vaporproof barrier wrap.

After the meat unit has been packaged, usually within the time of 1 hour to 1½ hours, it is immediately subjected to as low a temperature as is economically and commercially feasible to bring the temperature of the meat unit below the 40° F. limit set by the USDA regulations.

The low temperature conditioning of the packaged meat unit is preferably, though not necessarily, achieved through the contact with a refrigerating medium at extremely low temperatures. For instance, gaseous mediums such as air, carbon dioxide, or chlorinated hydrocarbons known as "Freon," nitrogen, or a liquid such as propylene glycol, liquid "Freon" or the like, may be used to rapidly cool the product. Air is usually preferred since the temperatures found useful may range between −20° and −40° F. and may economically be used to quickly and economically bring about the unique cooling concept.

As soon as the packaged meat unit comes in contact with the cold gaseous blast, the surface of the meat unit which may be at a temperature above 40° F. and usually above 60° F. is reduced in temperature, and within one-half hour generally, the surface of the meat unit will be frozen and at a temperature of 27° F. or lower. The internal temperature of the meat will vary, but is usually above 60° and 105° F. normally 90°–97° F. when packaged promptly after slaughter and cut up. It should be understood that the time at which the packaged meat unit is subjected to the cooling medium and the temperature or selection of the particular medium is not critical to the present invention, it being only important that dual conditions of forming the desired negative heat content and maintaining the temperature gradient of at least 20° F. be met. To meet the required negative heat content for poultry, at least the temperatures of below 27° F. and preferably 0° to 27° F. must be achieved in the outer surface zone of the meat unit. This outer or surface zone is that portion that is substantially uniform in thickness and outermost as packaged to be contacted by the cold environment. The temperatures referred to may be measured by pressing the sensitive end of the thermocouple probe against the product surface inside the film of the package and may be inserted into the product to detect the internal temperature. Since the freezing point of poultry tissue is adjusted to be approximately 28° F. the temperature required to be imposed upon the surface zone is 27° F. or lower, during which time the natural juices, fluids, and tissues of the meat unit present in the surface zone will freeze to create a latent heat content in the surface zone which is capable of absorbing an amount of heat equivalent to the latent heats of fusion identified with each of the components within the surface zone. If the temperature is lowered as is preferable below the freezing point of the tissue and fluids in the outer or surface zone, additional heat absorbing capability is realized in the form of sensible heat from the frozen surface zone. The latter includes the sensible heat above and below the freezing point of the tissue and fluids and the final equilibrated temperature as may be easily calculated. These all form the negative heat content reservoir or bank which is to be relied upon to absorb the heat from the inner zone. The inner zone at this time has not been able to be lowered to the desired temperature due to maintenance of the temperature gradient of at least 20° F. between skin temperature and internal zone, and will give up its heat to the surface zone during equilibration.

The time that the packaged meat unit is subjected to the cooling medium which in the case of air at −40° to −20° F. is usually 60 to 110 minutes. However, it has been pointed out that this time is not critical, it only being important that sufficient negative heat capacity be built up in the reservoir in the surface zone by freezing only the surface zone while maintaining the proper gradient. Generally speaking, however, for a cooling medium having temperatures of 0° F. and below to about −100° F. the time for the packaged unit to be subjected to such a cold blast may vary from one-half hour to 5 hours.

If a liquid cooling medium at a temperature of −10° to +15° F. is raised, the time may vary between one-half hour and 2 hours.

As soon as the negative heat content reservoir has achieved the necessary cooling capacity to subsequently cool the remaining approximately two-thirds of the mass of the meat unit forming the internal zone, the packaged meat unit is removed from the blast chiller and subjected to a cold storage room where equilibration of the meat unit takes place. The temperature of the storage room should be anywhere between 29° and 40° F. The equilibration temperature of the meat unit is 28° to 39° F.

At the time of removal from the chiller, the temperature of the internal zone may vary between about 30° and 45° F. Generally, the internal zone temperatures are approximately 34° to 44° F. while the external skin temperature and essentially the temperature of the surface zone varies between 5° and 25° F.

Upon storage at the temperature above the freezing point of the tissue and above the temperature of the surface zone, the time necessary for tenderization and equilibration occurs. The heat is extracted from the internal zone in the amount of the sensible heat of the frozen tissue and primarily the latent heat of fusion of the frozen tissue in the surface zone and, if necessary, the sensible heat of the thawed tissue in the surface zone. With a temperature of the cold storage room of approximately 35° F. the meat unit will equilibrate to approximately 30° F. within 2 hours to 4 hours time. This time is not critical for the equilibration since the poultry may be kept in the cold storage room without appreciable deterioration for 7 to 10 days or longer before shipping to the retailer. This is a much longer time than is necessary, but does illustrate how much leeway the poultry processor has with this new process.

In one of the unique aspects of the present invention, the meat unit is only frozen in the surface zone so that all of the natural enzymes present in the internal zone continuously act to produce their natural tenderization during the blast-chilling period and also during the period of time after the packaged meat unit is removed from the blast freezer and placed in the storage room. The surface zone tenderization restarts as soon as the surface zone gives up the latent heats of fusion. Usually, in 3 to 12 hours the natural tenderizing of the entire meat unit is completed, but preferably 36 to 42 hours has been found to provide optimum tenderness. An important and notable fact is that the surface zone which has been toughened by the action of the feather-picking fingers will be more tender.

The packaged meat products when treated with the present process may be maintained by the wholesaler or retailer for a total shelf life of 21 to 28 days after slaughter at a temperature between 30° F. and a temperature below 40° F. Generally, it is believed that a temperature of about 32° to 35° F. is quite acceptable to attain such long storage characteristics, and at the same time assure that the product will not be surface-crusted upon arrival at store level.

It has been determined that in accordance with the present procedure it is possible for a period of several weeks storage to have elapsed and still the net weight of the poultry product as received by the consumer will be stable at up to 73 to 75 percent of the live weight. Actual average results from dry yield tests taken with cut-up birds which were not washed was 74.76 percent of the live weight but included the giblets on birds of sizes 2⅔ pounds to 3¼ pounds dressed weight.

Numerous advantages have been found to be present in the practice of the present invention including 1. The tenderness and taste of the products are considerably improved since there is no washing out or dilution of the natural body juices. Losses of skin, fat, etc., which frequently occurred in the past when the meat units are passed through the chiller or vat are reduced in view of the reduced handling.

2. The hot cut-up shrink from loss of moisture is only 1 percent or less of the weight of the meat as compared to approximately 2½ percent for any cut-up losses which occur subsequent to chilling. This is an unexpected advantage and is one of the reasons for the higher final product weight at time of sale than would normally be expected without the water-chilling method.

3. Tests have shown that the meat units processed in accordance with the present invention show no detectable weep of water fluids even 7 days after processing when the package was stood on one end in a 75° F. room for 8 hours, and the product temperature was allowed to rise to 50° F. or above. This is an extreme test and one that could not be met successfully by any water-chilled product. Clearly, the lack of weepage means much greater accuracy in predicting the guaranteed net product weights for delivery or sale within any specified time after processing.

4. The meat unit products are adjudged to have a far better appearance in bloom and a more natural color.

5. A substantially greater shelf life of up to 28 days is possible even at temperatures between 32° and 40° F. because of elimination of the high bacteria count chilling water used to chill present poultry products.

The following is a specific example of the present process:

A plump chicken which is killed and dressed, including eviscerating, and afterward weighed 3 pounds including giblets. The time between the killing and eviscerating was 20 minutes. The body temperature of the chicken after evisceration was 98° F. The chicken was washed immediately after eviscerating, and the body temperature of the chicken after washing was 95° F. The temperatures here given, unless specified, are the internal temperatures of breast or thigh which are the highest temperatures of the bird. The temperatures were recorded by thermocouples which were pressed into the surface of the skin while others were positioned beyond the surface zone into the internal zone. The time elapsing for the washing and optional cutting was approximately 10 minutes, and the bird cut up or whole was packaged in polyethylene bags and placed into the freezer within 20 additional minutes. The temperature of the chicken varied from a skin temperature of 88° F. to an internal zone temperature of 87° F. The packaged cut-up or whole chicken was placed on a conveyor and passed through a chilling tunnel and exposed to blasts of cold air at temperatures of −40° F. The packaged chicken remained in the chilling apparatus for approximately 60 minutes. Upon removal of the chicken, it was found that the skin temperature (S) was approximately 10°–12° F., and the internal zone temperature (I) approximately 33°–34° F. for a gradient (I–S) of 21°–24° F. The temperature gradient was constantly maintained at greater than 20° F. once it has been reached—approximately 20 minutes after initial contact with the air blast. The accompanying table sets forth the specific temperatures.

The surface zone was frozen at a temperature that varied from 0° F. at the skin to 27° F. at the innermost extent of the surface zone, also measured by appropriately placed thermocouples. At this temperature, one-sixth of the meat of the chicken was crust-frozen within the surface zone, and a sufficient negative heat content was developed whereby the remaining five-sixths of the chicken, including the internal zone having the highest temperature, would be cooled to the desired temperature.

Upon removal from the airblast tunnel, the chicken was placed in a cold-storage room and maintained at 32° F. Within 3 hours the chicken had equilibrated to a temperature of 32° F.

The chicken was sampled and found to be tender and juicy even after being maintained in the storage room up to 28 days.

The enzymes were permitted to proceed with their enzymic action to tenderize the meat. Notably, the outer surface zone was found to be tenderized after the freezing due to the equilibration and thawing.

TABLE.—UN-CHILLED WHOLE BROILERS—SKIN TEMPERATURE VS. INTERNAL TEMPERATURE

[Number 1 Bird—Whole poly-bagged]

| I−S, ° F. | Time/ minutes | Air blast, ° F. | Internal (I) a ° F. | Skin (S) b, ° F. |
|---|---|---|---|---|
| (1) | 0 | −40 | 88 | 87 |
| 32 | 12 | −40 | 70 | 38 |
| 31 | 24 | −40 | 61 | 30 |
| 23 | 36 | −40 | 47 | 24 |
| 21 | 48 | −40 | 40 | 19 |
| 21 | 60 | −40 | 33 | 12 |

Number 2 bird—whole cut-up tray packed

| | | | | |
|---|---|---|---|---|
| 0 | 0 | −40 | 87 | 87 |
| 30 | 12 | −40 | 66 | 36 |
| 24 | 24 | −40 | 50 | 26 |
| 26 | 36 | −40 | 46 | 20 |
| 21 | 48 | −40 | 37 | 16 |
| 24 | 60 | −40 | 34 | 10 |

NOTE:
a Thermocouple Probe in deep internal breast muscle.
b Thermocouple Probe pressed into skin under film of package.

I claim:

1. A process for packaging and preserving meats comprising: slaughtering the animal to produce a carcass, dressing, eviscerating and cleaning the carcass and forming the same into meat units having an exposed surface zone including the skin and an internal zone beneath said surface zone, said surface zone comprising up to approximately one-third to one-sixth of the outermost exposed mass of said meat unit, packaging the meat while warm in packages to comprise a meat unit prior to attaining a temperature of 40° F. in a vaporproof package within approximately 2 hours after slaughter to prevent shrinkage of the meat due to evaporation, exposing the packaged meat unit to a chilling gaseous medium for sufficient time to establish, (a) a temperature gradient of at least 20° F. between the skin temperature and the internal zone temperature of the meat unit, and (b) a negative heat content reservoir within said surface zone, said negative heat content reservoir including a sensible heat content and a latent heat content, said reservoir being formed by reducing the temperature of the mass of said meat unit within said surface zone to a selected temperature below 27° F. while maintaining said gradient to create said sensible heat content and to extract the heats of fusion of said mass within said meat unit to freeze said mass and provide said latent heat content, withdrawing said packaged unit from exposure to said chilling gaseous medium upon attaining an internal zone meat unit temperature of approximately 30° through 44° F. and a sufficient negative heat content reservoir to absorb all of the sensible heat present in said internal zone above a preselected equilibration temperature, maintaining said packaged meat at a temperature above 28° F. and not above 40° F. for a sufficient time to absorb the sensible heat from said internal zone into said negative heat content reservoir, and equilibrate the temperature throughout the meat unit to above the freezing temperature whereby to avoid natural meat juice weeping during storage, and to promote natural enzymic action to effect tenderization of the meat.

2. The process of claim 1 wherein said package includes a tray and a flexible vaporproof overwrap.

3. The process of claim 1 wherein the temperature of the meat units after packaging is 60°–105° F.

4. The process of claim 1 wherein said surface zone is chilled to 0°–27° F.

5. The process of claim 3 wherein said surface zone is chilled to 0°–27° F.

6. The process of claim 1 wherein the carcass is the meat unit.

7. The process of claim 1 wherein the temperature of said chilling medium is below −20° F.

8. The process of claim 1 wherein the equilibrated temperature of the packaged meat unit is 28°–39° F.

9. The process of claim 8 wherein the temperature of the meat units after packaging is 60°–105° F., said surface zone is chilled to 20°–27° F., the temperature of said chilling medium is below −20° F. and the equilibrated temperature of the packaged meat unit is 28°–39° F.

* * * * *